Aug. 26, 1969 J. K. LANIER 3,462,925
MOWING APPARATUS
Filed May 18, 1967 3 Sheets-Sheet 1
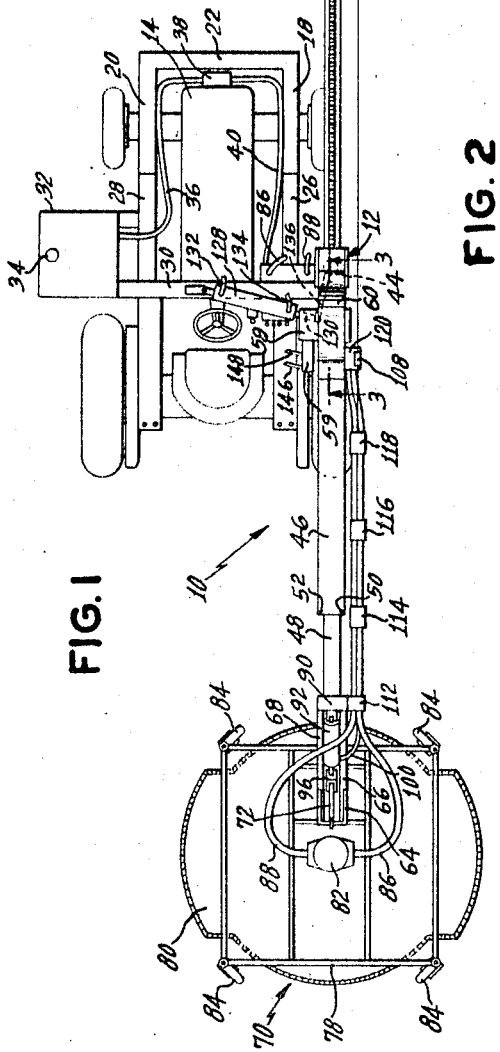
INVENTOR.
Jack K. Lanier
BY
George H. Baldwin
ATTORNEY Aug. 26, 1969　　　J. K. LANIER　　　3,462,925
MOWING APPARATUS
Filed May 18, 1967　　　　　　　　　　3 Sheets-Sheet 2
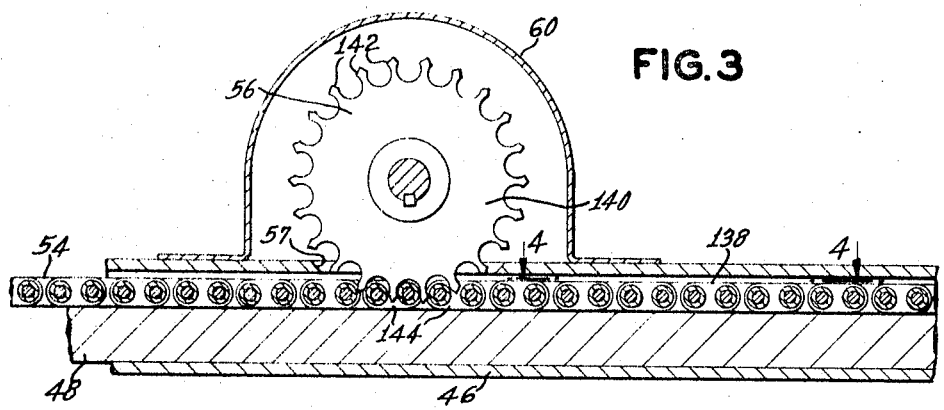
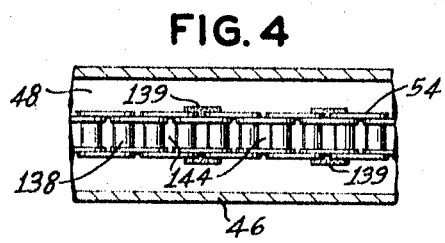
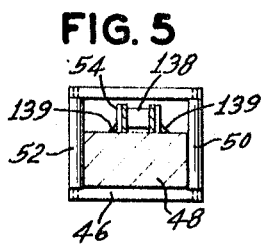
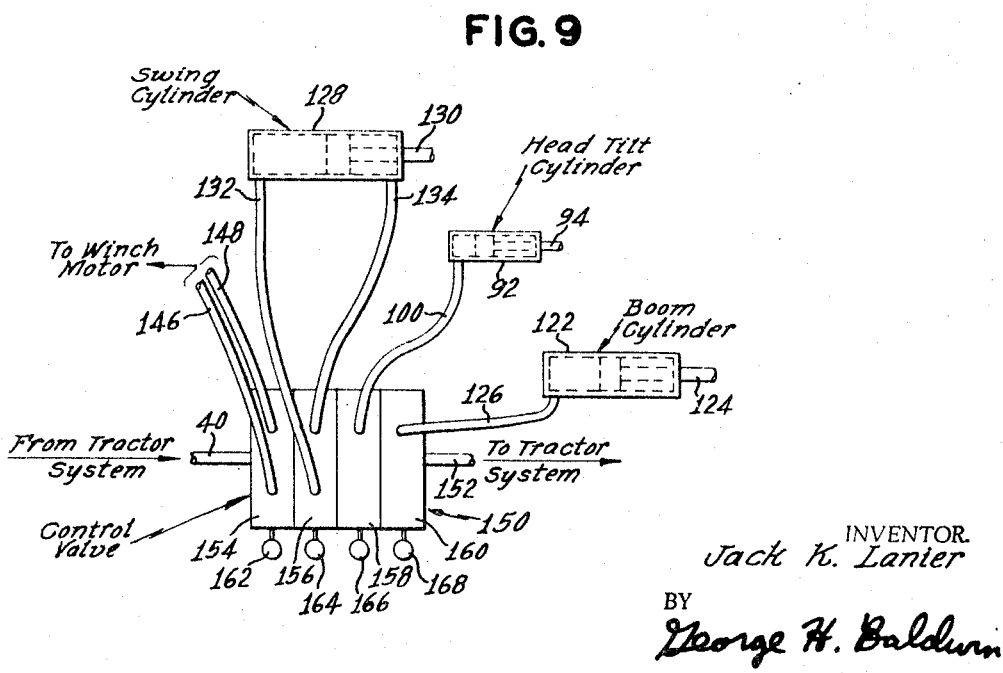
INVENTOR.
Jack K. Lanier
BY
George H. Baldwin
ATTORNEY Aug. 26, 1969    J. K. LANIER    3,462,925
MOWING APPARATUS
Filed May 18, 1967    3 Sheets-Sheet 3

INVENTOR.
Jack K. Lanier
BY
George H. Baldwin
ATTORNEY

United States Patent Office 3,462,925
Patented Aug. 26, 1969

3,462,925
MOWING APPARATUS
Jack K. Lanier, Jacksonville, Fla., assignor to Best Equipment Company, Jacksonville, Fla., a corporation of Florida
Filed May 18, 1967, Ser. No. 639,367
Int. Cl. A01d 55/26
U.S. Cl. 56—25.4　　　　　　　　　　　　　　9 Claims

ABSTRACT OF THE DISCLOSURE

A mowing apparatus mountable on an ordinary tractor for mowing the shoulders, ditches and banks at the sides of roadways, while the supporting vehicle travels over the roadway. The apparatus including an adjustable cutter head which is connected to the outer end of an extensible, elongated, limber boom member; the connection between the boom member and the cutter head being such as to permit the head to freely follow the contours of the ground over which it travels during mowing operations, relatively uneffected by any movement of the supporting vehicle relative to the mower head. The cutter head being positionable and operable both angularly and laterally and in any plane at various distances from the side and rear of the supporting vehicle. The limber boom member being adjustable both inwardly and outwardly of the supporting vehicle by means of a rack and pinion arrangement.

BACKGROUND OF INVENTION

Field of invention

This invention relates to an improved mobile mowing apparatus for cutting vegetation from the sides of a highway. More patticularly, the invention pertains to a means for and method of mowing grass, weeds and the like at some distance from the mower supporting and driving mechanism, as for instance grass, weeds and like vegetation in the ditches and on embankments beside a highway or railroad right-of-way.

Description of the prior art

One of the most difficult problems faced by both governmental and industrial maintenance departments is cutting of grass and weeds on steeply inclined slopes and on inaccessible places, such as bridge approaches, side walls and bottom of drainage ditches, fire walls, railroad right-of-ways and etc. The mowing of shoulders and other like areas along the sides of a highway is a costly and laborious task, and a large portion of this work is now being manually performed. Along these areas the ground usually slopes at too great an angle for a conventional mower to operate safely thereon, or as in the case of the bottom of drainage ditches, these areas are simply inaccessible to the conventional mower.

Mowing machines designed to cut the grass in these areas have been suggested in the past. Usually these machines employed extensible booms holding the mower head in position to cut along the sloping inaccessible ground with the boom being supported by a mobile carrier, such as a tractor, which remains relatively level on accessible ground. With this arrangement any movement of the tractor effected the position of the mower head relative to the ground. Thus if one wheel of the tractor encountered a low place it would tilt, moving the mower head toward or away from the ground. For this reason the operator had to be continually alert to such changes to make the necessary adjustments in the position of the boom to maintain the mower head properly spaced above the ground.

In addition, the extensible boom heretofore used in mowing machines of this type were large heavy complicated mechanisms which usually employed hydraulic pistons and cylinders to move the boom inwardly and outwardly. Being of such complicated construction and heavy in weight these booms increased the maintenance problems connected with the operation of the mower and required a strong and usually more complicated structure to support the boom.

SUMMARY OF THE INVENTION

It is therefore a general object of this invention to provide means for cutting vegetation which means may be supported in spaced relation from a road vehicle and controlled and driven from the vehicle.

Another general object of the instant invention is to provide an efficient mowing machine adapted to be supported from and to travel over a highway and which is adjustable for mowing the shoulders, ditches and banks at the sides of the highway.

Another object of the subject invention is to provide a mowing machine which may be conveniently mounted upon a vehicle and which has overhanging and adjustable supporting means for holding the mowing cutter head in various angulated positions and at various distances from the side and rear of the supporting vehicle.

Still another general object of this invention is to provide a mowing machine adapted to be mounted on a mobile carrier and having a mower head carrier by a boom which allows the mower head to freely follow the contours of the ground over which it travels substantially unaffected by any movement of the mobile carrier relative to the mower caused by the contours of the ground over which the carrier travels.

A more specific object of this invention is to provide a mower and mower controlling and actuating mechanism which may be applied as an attachment to an ordinary tractor.

Another specific object of the subject invention is to provide a mowing machine wherein the angulation of the mowing head and all adjustments may be controlled from the vehicle on which the device is supported.

Still another specific object of the invention is to provide an extensible boom assembly of improved design and having a limber boom member which is adapted for use with a mowing apparatus which is lightweight and employs relatively few parts and which is operated by a simple, efficient and easily repaired mechanism.

Yet a further specific object of this invention is to provide an extensible boom assembly having a limber boom member adapted for use with mowing apparatus which does not employ telescoping members and which is simple slideably supported by a sleeve whose length can be substantially shorter than the boom.

In general these objects are accomplished by providing an improved mowing apparatus including mower controlling and actuating mechanisms which may be applied as an attachment to an ordinary tractor. The mowing apparatus which is generally supported from and travels over a highway is adjustable to mow the shoulders, ditches and banks at the sides of roadways and includes a cutter head which is connected to the outer end of an extensible boom assembly in a manner such that the cutter head is adjustable in angulated position and at various distances from the side and rear of the supporting vehicle. The cutter head may be positioned and driven in any plane and moved up and down laterally at the will of the operator, being controlled from the vehicle on which the mowing device is supported. The connection between the outer end of the extensible boom assembly and the cutter head is such that a certain universal motion is permitted between head and boom, allowing the head when desired to freely follow the contours of the ground over which it travels during the mowing operations relatively unaffected by any movement of the carrying vehicle relative to the mower head. The extensible boom assembly employed in the mowing apparatus includes an elongated, limber boom member which is simple, slidably supported by a sleeve whose length is substantially shorter than the boom member; the boom member being extendable and retractable by means of a rack and pinion.

DESCRIPTION OF THE DRAWINGS

The novel features which are believed to be characteristic of this invention are set forth with particularity in the appended claims. The invention itself, however, both as to its organization and method of operation, may best be understood by reference to the following description taken in connection with the accompanying drawings, in which:

FIG. 1 is a top plan view of the improved mobile mowing apparatus of this invention;

FIG. 2 is a side elevational view of the improved mobile mowing apparatus of this invention;

FIG. 3 is an enlarged transverse sectional view taken along line 3—3 of FIG. 1;

FIG. 4 is a transverse sectional view taken along line 4—4 of FIG. 3;

FIG. 5 is an enlarged cross-sectional view taken along line 5—5 of FIG. 2;

FIG. 9 is a diagrammatic view of a portion of the hydraulic system and hydraulic controls of the mowing apparatus.

DETAILED DESCRIPTION

Figure 6:
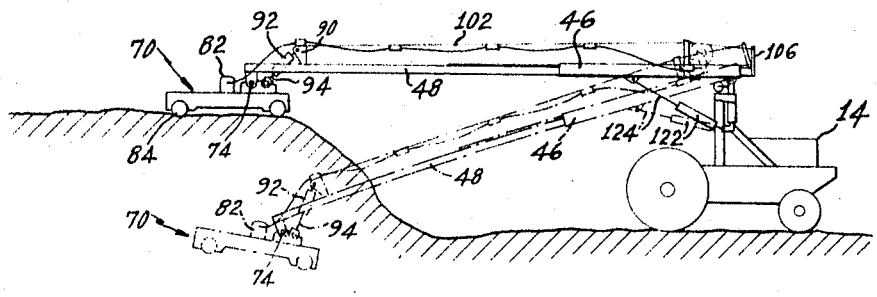
FIG. 6 is a side elevational view of the improved mobile mowing apparatus of this invention with its boom fully extended in operation mowing the top and side of a small hill.

Referring to the drawings in detail now, and in particular to FIGS. 1 and 2 thereof, the improved mowing apparatus 10 of this invention is shown in detail therein. The mowing portion 12 is detachably mounted on a conventional or ordinary type tractor 14. The mowing machine includes a frame 16 which is detachably mounted to the tractor adjacent its axles. Frame 16 includes two longitudinal generally horizontal members 18 and 20 and a generally horizontal transverse member 22. The frame further includes two generally upright members, such as at 24, which are attached to members 18 and 20 and are supported in upright position by bracing members 26 and 28 extending between the uprights and the respective horizontal members to which they are attached. The frame is completed by a generally horizontal transverse member 30 extending across the top of the upright members.

A reservoir 32 is attached to the side of frame 16 and provided to contain the fluid used in the hydraulic system which controls and operate the moveable portions of the mowing apparatus. The reservoir is provided with a fill cap 34 on the top thereof, the fill cap also acts as a breather for the reservoir. Additional weight may be added to the reservoir 32 or below the same to aid in counterbalancing the mowing portion of the apparatus which is mounted to the other side of frame 16. A hydraulic hose 36 leads from the outlet of the reservoir 32 to the inlet side of a hydraulic pump 38 mounted at the front of the tractor and driven by the engine of the tractor. A second hydraulic hose 40 leads from the outlet side of pump 38 to the control valves for controlling the operation of the moving parts of the mowing apparatus.

Mounted to upright member 24 and cross member 30 of the frame is a mounting bracket or assembly 42 by which and through which the extensible boom 43 of the mowing apparatus is mounted to frame 16. Rotatably mounted within bracket assembly 42 is a swing pin assembly 44 to which the boom 43 is attached. Pivotally connected to the upper end of swing pin assembly 44 is the shorter and outer boom or sleeve like member 46 in which and through which the elongated and inner boom member 48 moves. A pair of generally upright rollers 50 and 52 are mounted for rotation about their longitudinal axes within the outer end of shorter boom member 46 to help align and position elongated boom member 48 within short boom member 46 and additionally guide and aid the inner boom member 48 in moving through the outer boom member 46.

The inner, longer boom member 48 is slidably movable within outer shorter boom member 46 by power means including a rack 54 attached to the top of boom member 48 and pinion 56 attached to the outer boom member 46 and extending through an opening 57 (see FIG. 3) in the top thereof to mesh with rack 54. Pinion 56 is powered by a winch 58 and a winch motor 59 which is hydraulically controlled and operated. A protective cover 60 is positioned over pinion 56 and attached to the top of short boom member 46.

Elongated, limber boom 48 terminates in an outer end 62 which has connected thereto a forked boom head 64 having two fork-like tines or members 66 and 68. Cutter head assembly generally indicated by reference numeral 70 is connected to the outer end of forked boom head 64 by means of a coupling assembly 72 which is pivotally connected by pin 74 to the forked members 66 and 68 of boom head 64 to permit rotation between cutter head assembly 70 and the outer end of boom member 48. A second pin 76, which is generally perpendicular to pin 74 pivotally connects coupling assembly 72 to the cutter head frame 78, which in turn is attached to the cutter head housing 80, such that cutter head assembly is rotatable with respect to coupling assembly 72. In other words, the positioning and combination of the two pins 74 and 76 permits a universal motion between the cutter head assembly 70 and the outer end of elongated boom member 48. Centrally positioned within head assembly 70 and connected to cutter head frame 78 and cutter head housing 80 is a hydraulic fluid motor 82 which powers the cutting blades (not shown) used in this improved mowing apparatus. The blades are positioned on the underside of housing 80 and are attached to the lower end of the shaft within fluid motor 82. The cutter head assembly 70 is further provided with swivel wheels, as at 84, attached to the cutter head frame 78 to support the cutter head assembly at appropriate positions above the ground over which the cutter head assembly travels in mowing the grass, weeds, brush and the like. Hydraulic fluid motor 82 is powered by hydraulic fluid flowing in hydraulic fluid line 86; the spent hydraulic fluid after flowing through fluid motor 82 returns to the hydraulic system through hydraulic fluid hose 88. A safety guard is provided for the cutting blades by attaching and depending short, closely spaced link chains 81 to the outer edge of housing 80.

A generally upright bracket 90 is connected to the inner end of forked boom head 64 on its top side. A hydraulic cylinder 92 and piston 94 are positioned between the forked members 66 and 68 of the boom head 64 with the upper end of cylinder 92 being attached to bracket 90 and the lower or yoke end 96 of piston 94 attached to mounting bracket 72 at a point remote from pin 74 by means of an additional pin 98. In this manner upon actuation of cylinder 92 and piston 94 by means of hydraulic flow line 100 the cutter head assembly 70 can be made to pivot about pin 74 such as to rotate relative to the end of elongated boom member 48.

A wire line or cable 102 is connected to the elongated boom member 48 and extends from its inner end 104 to its outer end 62 adjacent boom head 64. Cable 102 is attached and supported by bracket 90 at its outer end and a second bracket 106 at inner end 104 such that the same is spaced above and slightly to one side of boom member 48 (see FIGS. 1 and 2). A support 108 attached to outer boom member 46 is additionally used to aid in supporting cable 102 along its midportion. The support 108 is provided with a pulley 110 over which cable 102 rolls and is guided thereby as boom member 48 is extended and retracted.

Figure 8:
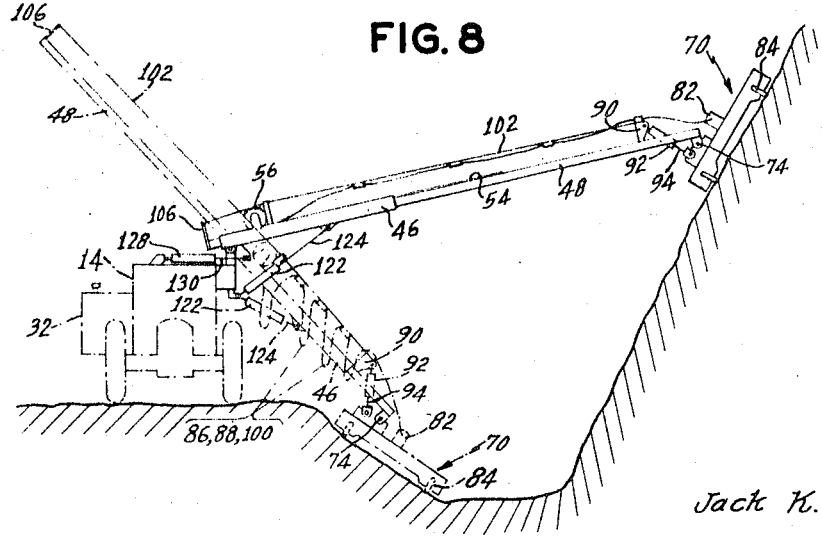
FIG. 8 is an end elevational view of the improved apparatus showing the same in various positions mowing the sides of a culvert.

Hydraulic fluid hoses 86 and 88 respectively running to and returning from fluid motor 82 and hose 100 extending to hydraulic cylinder 92 from the tractor are gathered and bunched together and placed within sleeves 112 through 120 which are appropriately spaced between the tractor and cutter head 70. Sleeve member 112 is connected to bracket 90 adjacent its top and side closely adjacent the connection of wire line 102 thereto and sleeve member 120 is fixedly attached to outer boom member 46 adjacent the bottom of support 108. Sleeve members 114, 116 and 118 with the hoses gathered therein are slideably positioned around wire line 102 such as to support the hydraulic fluid hoses 86, 88 and 100 at spaced intermediate points on the cable 102. In this manner the hoses can become completely extended, as indicated in FIG. 8, when boom member 48 is completely extended and can be contracted and compacted in an accordian fashion when boom member 48 is contracted, such as depicted in the dashed-line configuration of FIG. 8 and as shown in FIG. 2. Thus the hydraulic hoses are at all times supported from wire line 102 while they remain completely out of the way of the tractor and cutter head assembly and are subjected to a minimum amount of wear and tear during use and operation of the mowing apparatus. Sufficient slack is provided between fixed sleeve 112 and cutter head 70, and between fixed sleeve 120 and the hydraulic controls on the tractor to allow for complete freedom of motion between the boom head and cutter head at one end and the outer boom member 46 and the tractor 14 at the other end of the hoses.

A hydraulic cylinder 122 and piston 124 operate and swing boom assembly 43 in a vertical plane. Cylinder 122 has its inner end attached to the lower end of swing pin assembly 44 and the outer end of piston 124 is attached to the underside of outer boom member 46 such that the piston and cylinder move with the boom assembly when traveling in a horizontal arc. Cylinder 122 and piston 124 are operable by means of hydraulic flow line 126 which is connected into the central hydraulic system such that upon actuation of piston 124 within cylinder 122 boom assembly 43 is lifted through a vertical arc pivoting about the connection of the boom assembly 43 to the top of swing pin assembly 44. Upon release of the hydraulic pressure within cylinder 122 the outer end of boom member 48 with cutter head assembly 70 attached thereto will move downward until the same is either checked by hydraulic piston and cylinder 122 and 124 or the wheels 84 of the cutter head assembly come to rest upon the ground (see FIG. 8).

Figure 7:
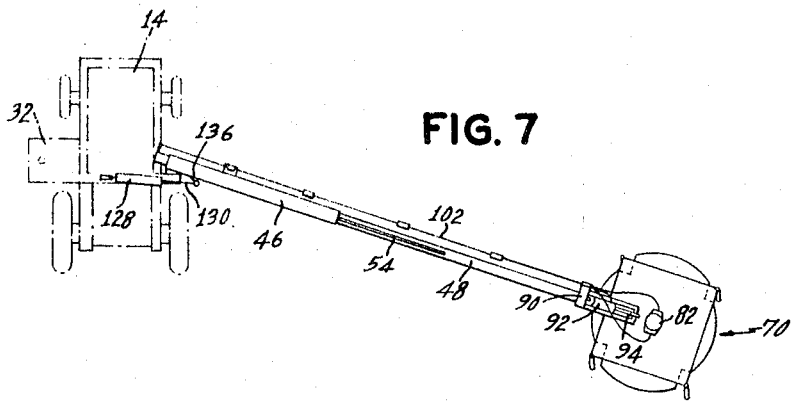
FIG. 7 is a top plan view of the improved mowing apparatus with its boom fully extended.

A third cylinder 128 and cooperative piston 130 are provided to move and control boom assembly 43 in the horizontal plane, pivoting the same with swing pin assembly 44 within its bracket assembly 42. The cylinder and piston 128, 130 are controllable by hydraulic flow lines 132 and 134 which are connected into the central hydraulic system to move the boom assembly 43 from the position as indicated in FIG. 1 to position outward of the side of tractor 14, similar to the position as depicted in FIG. 7. One end of cylinder 128 is attached to cross member 30 of frame 16 and the opposite end of piston 130 is attached to an extension 136 of the swing pin assembly 44 such that the cylinder and piston are capable of pivoting swing pin assembly 44 about the center line of its pin member extending through the generally vertical opening within bracket assembly 42.

With particular reference to FIGS. 3, 4 and 5 now, details of the rack 54 and pinion 56 used to move the limber boom member 46 inward and outward of the tractor and outer boom member 46 are shown therein. Specifically the rack 54 and pinion 56 of the improved mowing apparatus of this invention are a chain 138 and sprocket wheel 140. Chain 138 is spot-welded at spaced points such as at 139 to the top of limber boom member 48. In this manner the chain 138 is allowed to remain somewhat flexible, such that it may slightly expand or contract as needed during the flexing of limber boom member 48. Sprocket wheel 140 includes a plurality of equally spaced sprockets 142 which engage within the openings 144 of chain 138. The sprocket wheel 140 is splined to the shaft of winch 58 which is powered in both the forward and reverse directions by hydraulic motor 59 and controlled by hydraulic fluid lines 146 and 148 (see FIG. 1) which are connected into the central hydraulic system of the mowing apparatus. Upon actuation of the winch motor 59 sprocket wheel 140 is driven such that the sprocket 142 engage within the openings 144 of the chain 138 to drive and move elongated inner boom member 48 outward of outer boom member 46 between rollers 50 and 52 such as to extend the cutter head assembly 70 away from the tractor as depicted in the solid line configuration of FIG. 8. Upon reversing the winch motor and sprocket wheel, boom member 48 is driven inward of outer boom member 46 such as to bring the cutter head assembly 70 more closely adjacent the tractor as depicted by the dashed line configuration of FIG. 8.

Diagrammatically depicted in FIG. 9 is the hydraulic system used to control, move and position boom assembly 43 and cutter head assembly 70 attached to the outer end thereof. This portion of the hydraulic system includes a main control valve arrangement 150 which is attached on its input side to the hydraulic system by means of main hydraulic hose 40 leading from hydraulic pump 38 and on its return side to a hydraulic hose 152 returning the spent or used hydraulic fluid to the hydraulic system and to the reservoir 32 (see FIG. 1). Main control valve arrangement 150 includes four lesser control valves 154, 156, 158 and 160 which individually control the various hydraulic components used in positioning cutter head assembly 70. Knob or handle 162 controls and manipulates valve 154 such as to permit pressurized hydraulic fluid to flow through hydraulic line 146 to the winch motor 59 when the knob is in one position to cause inner boom member 48 with attached head 70 to move outward of the tractor and when in a second position to permit pressurized hydraulic fluid to flow through hydraulic flow line 148 to turn the winch motor 59 in the opposite direction causing the cutter head 70 and inner boom member 48 to move inward toward the tractor. A third or neutral position for knob 162 of valve 154 is provided such that the pressure within hydraulic lines 146 and 148 is balanced enabling winch 58 to remain stationary holding inner boom member 48 in a predetermined position within outer boom member 46.

A knob or handle 164 controls the operation of valve 156 such that when this handle is in one position pressurized hydraulic fluid passes through hydraulic flow line 132 to actuate cylinder 128 of piston 130 moving the boom assembly 43 and head 70 in a horizontal plane from a position adjacent the tractor, as depicted in FIG. 1, to a position outward of the side of the tractor as depicted in FIGS. 7 and 8. By positioning knob 164 in a second position within valve 156 fluid flows through line 134 to operate cylinder 128 and piston 130 in the opposite direction such as to cause the boom assembly to move back from a position in which the cutter head assembly 70 is out to the side of the tractor to a position where the cutter head assembly 70 is in a position substantially trailing behind the tractor. A third position exists within valve 156 for control knob 164 such that the pressure within flow lines 132 and 134 is balanced whereby the boom assembly 43 is maintained in a predetermined position.

A handle 166 controls the operation of valve 158 which is connected through hydraulic flow line 100 to cylinder 92 and piston 94 positioned between the outer end of inner boom member 48 and the cutter head assembly 70 such as to cause the head 70 to pivot or rotate with respect to the boom, from a position similar to that as depicted in the solid line configuration of FIG. 6 to a position similar to that as depicted in the solid line configuration of FIG. 8. With handle 166 in one position within valve 158 pressurized hydraulic fluid moves through line 100 to cylinder 92 causing piston 94 to move outward therefrom to tilt the inner side of cutter head assembly away from the boom end as depicted in the solid line configuration of FIG. 8, when the handle 166 is in a second position the pressure within line 100 and the pressure on piston 94 is equalized such that head assembly 70 is maintained in a desired predetermined position. A third position exists for handle 166 of valve 158 such that the pressure within fluid line 100 is nil allowing piston 94 to move freely within cylinder 92 such that cutter head 70 is free to follow the contours of the ground over which it travels on its wheels 84 when the boom cylinder 122 and piston 124 are also in the relaxed state or condition with piston 124 free to move within cylinder 122.

Valve 160 is controlled by a handle 168 such as to operate cylinder 122 and piston 124 whereby boom assembly 43 is operated, controlled and manipulated in the vertical plane. When handle 168 is in one position pressurized fluid flows through hydraulic line 126 to operate the piston 124 and cylinder 122 to lift boom assembly 43 into a position similar to that as depicted by the solid line configuration of FIG. 8, and when handle 168 is in a second position within valve 160 the pressure within line 126 balances the pressure on piston 124 such that the boom assembly 43 is maintained in a desired predetermined position. A third position is available for handle 168 within valve 160 to remove the pressure from hydraulic fluid within flow line 126 such that piston 124 is relaxed within cylinder 122 and can move freely therein, whereby the outer end of boom assembly 43 will move downward from an elevated position until the wheels 84 come in contact with the ground, or the downward movement is checked by repositioning control handle 168. When control handle 168 is in the position which allows piston 124 to move freely within cylinder 122, the boom members 46 and 48 are in a relaxed condition such that head 70 can follow the contours of the ground over which it moves, if the head tilting cylinder 92 and its piston 94 are also in the relaxed condition with piston 94 free to move within cylinder 92.

The improved mowing apparatus of this invention is quite versatile, as can be seen from a study of FIGS. 6 through 8. The cutter head 70 can be manipulated by the proper operation of boom swing cylinder 128 and its piston 130 to mow from positions directly behind the tractor 14, as indicated in the solid line configuration of FIG. 6, to positions outward of the side of the tractor up to a position substantially perpendicular to the longitudinal axis of the tractor, one of such positions being depicted in FIG. 7. Through proper operation and adjustment of winch 58 controlling rack 54 and pinion 56, the mower head 70 can be made to mow the vegetation close to the tractor 14, such as depicted in the dashed-line configuration of FIG. 8, or at distances removed from the tractor, such as depicted in the solid line configurations of FIGS. 6 and 8. Of course it is to be understood that in adjusting boom member 48 so that head 70 can mow closely adjacent or at a distance removed from the tractor 14, head tilt cylinder 92 and its piston 94 and boom cylinder 122 and its piston 124 will also need to be adjusted and controlled. By proper manipulation of boom control cylinder 122 and its piston 124 cutter head assembly 70 can be made to mow vegetation at a level below that of the tractor 14, as indicated by the dashed-line configuration of FIG. 8, or at levels substantially above that of the tractor as shown in the solid line configurations of FIG. 6 and particularly FIG. 8. Head 70 can be made, upon proper control and manipulation of head tilt cylinder 92 and its piston 94, to cut vegetation in areas such that mowing head is generally parallel to the elongated boom member 48, as depicted in the solid line configuration of FIG. 6, or in areas where the mower head is at a substantial angle to the elongated boom member 48, as more clearly shown in the solid line configuration of FIG. 8.

At many times when cutter head assembly 70 is mowing relatively near to the tractor 14, the head is permitted to follow the contours of the ground over which it moves on its wheels 84 in mowing the vegetation. This type of mowing in which the head follows the contours of the ground over which it moves, makes use of the universal motion permitted in the head by pins 74 and 76. Head 70 is permitted to follow the contours of the ground over which it moves in mowing the vegetation thereon by relaxing piston 94 within cylinder 92 such that the piston is free to move in and out within the cylinder, and by relaxing cylinder 122 and piston 124 such that the piston can move freely back and forth within the cylinder.

On occasions when the cutter head 70 is mowing the vegetation at distances removed from tractor 14 with inner boom member 48 substantially extended, it is often the procedure to support a portion of the weight of the extended boom and cutter head on wheels 84 and the remainder of the weight by cylinder 122 and piston 124. On these occasions, such as depicted in FIG. 6 and the solid line configuration of FIG. 8, because of the structure and length of boom member 48 a certain limberness is imparted thereto such that head 70 is permitted a certain amount of limited upward and downward movement due to the flexing of boom member 48. That is to say, that with the boom member 48 substantially extended and locked in a desired predetermined vertical position by means of cylinder 122 and piston 124, cutter head 70 can substantially follow the contours of the ground over which it moves in mowing the vegetation, being permitted to rise and fall with the ground level due to the limberness and flexibility of elongated boom member 48.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a mowing apparatus for attachment to a tractor having an elongated sleeve member pivotally mounted on the tractor for tilting on a generally horizontal axis, power means for tilting said sleeve member, an elongated boom having an inboard end and an outboard end slidably supported in said sleeve member and having its said ends projecting from the ends of said sleeve member, and a mowing head pivotally attached to said outboard end of said boom, the improvement comprising a rack and pinion means including an elongated rack attached to and extending along an outer surface of said boom, a motor, a pinion driven by said motor, and in fixed location with respect to said sleeve member, said pinion being engaged with said rack for extending and retracting said mowing head.

2. In the mowing apparatus as defined in claim 1 wherein said rack is attached to and extends along the upper outer surface of said boom.

3. In the mowing apparatus as defined in claim 1 wherein said rack and pinion means includes an elongated chain affixed to the upper outer surface of said boom and a sprocket wheel engageable with said chain.

4. In the mowing apparatus as defined in claim 3 wherein said boom is limber whereby said upper surface thereof is bendable during use of the apparatus, said chain being fixedly attached at spaced intervals along said boom to permit flexing thereof during bending of said boom.

5. In a mowing apparatus for attachment to a tractor including an elongated sleeve member pivotally mounted on the tractor for tilting on a generally horizontal axis, power means for tilting said sleeve member, an elongated boom having an inboard end and an outboard end slidably supported in said sleeve member and having its said ends projecting from the ends of said sleeve member, and a mowing head pivotally attached to the outboard end of said boom, said head including a cutter and a hydraulic motor for powering said cutter, the tractor including a source of hydraulic pressure fluid, the improvement comprising means for sliding said boom in said sleeve, a cable disposed externally of said boom and of said sleeve and extending between and attached to each of said ends of said boom, a flexible hose extending externally along said boom for supplying hydraulic fluid from said source to said hydraulic motor, and a plurality of shoes engaged on said cable suspending said hose from said cable.

6. In the mowing apparatus as defined in claim 5 wherein said shoes are fixed at spaced locations along said hose and freely slideable along said cable, one end of said hose being fixed to said tractor, the other end of said hose being fixed to said hydraulic motor, said hose being of such a length as to be generally straight along said boom when said boom is in extended position and forming loose loops spaced adjacent each other and depending from said shoes when said boom is in retracted position.

7. In the mowing apparatus as defined in claim 5 further comprising selectively controlled hydraulic power means positioned between said mowing head and said outboard end of said elongated boom for tilting said mowing head and a second flexible hose for supplying hydraulic fluid from the source of hydraulic pressure fluid on the tractor to said power means, said plurality of shoes suspending said second flexible hose from said cable.

8. In the mowing apparatus as defined in claim 5 wherein said cable extending between and attached to each of said ends of said boom is spaced laterally of said boom.

9. In the mowing apparatus as defined in claim 5 wherein said means for sliding said boom in said sleeve includes an elongated rack attached to and extending along an outer surface of said boom, a motor, a pinion driven by said motor and in fixed location with respect to said sleeve member, said pinion being engaged with said rack for extending and retracting said mowing head.

References Cited

UNITED STATES PATENTS

| 1,911,516 | 5/1933 | Landing | 56—25 |
| 1,953,394 | 4/1934 | Clapper | 56—25 |
| 2,804,743 | 9/1957 | Gould et al. | 56—328 |
| 2,832,183 | 4/1958 | Pittman | 56—25 |
| 3,087,296 | 4/1963 | Cowles | 56—25.4 |
| 3,221,482 | 12/1965 | Cowling | 56—25.4 |
| 3,274,762 | 9/1966 | Jolls | 56—25.4 |
| 3,392,517 | 7/1968 | Nye | 56—328 |

RUSSELL R. KINSEY, Primary Examiner